(12) United States Patent
Stickle et al.

(10) Patent No.: US 9,185,008 B1
(45) Date of Patent: Nov. 10, 2015

(54) OPERATIONAL REPORTING IN A COMPUTING ENVIRONMENT

(71) Applicant: Amazon Technologies, Inc., Reno, NV (US)

(72) Inventors: Thomas Charles Stickle, Saint James, NY (US); Peter Klewinghaus, Baden-Württemberg (DE); Matthew Shawn Wilson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 264 days.

(21) Appl. No.: 13/829,756

(22) Filed: Mar. 14, 2013

(51) Int. Cl.
*H04L 12/26* (2006.01)
*H04L 12/14* (2006.01)
*H04L 12/18* (2006.01)
*G06Q 30/00* (2012.01)

(52) U.S. Cl.
CPC ............ *H04L 43/06* (2013.01); *H04L 12/1471* (2013.01); *H04L 12/1822* (2013.01); *G06Q 30/016* (2013.01)

(58) Field of Classification Search
CPC ............ H04L 41/5003; H04L 12/1417; H04L 12/1435; H04L 12/1822; G06Q 30/016
See application file for complete search history.

(56) References Cited

U.S. PATENT DOCUMENTS

| | | | |
|---|---|---|---|
| 2005/0102393 A1* | 5/2005 | Murray et al. | 709/224 |
| 2007/0266080 A1* | 11/2007 | McNicol et al. | 709/203 |
| 2007/0288630 A1* | 12/2007 | De Noia et al. | 709/224 |
| 2010/0085417 A1* | 4/2010 | Satyanarayanan et al. | 348/14.08 |
| 2011/0131335 A1* | 6/2011 | Spaltro et al. | 709/228 |

* cited by examiner

*Primary Examiner* — Ebrahim Golabbakhsh
(74) *Attorney, Agent, or Firm* — Lee & Hayes, PLLC

(57) ABSTRACT

In a system that provides network-based computer infrastructure services, a monitoring agent is installed on a computer to gather and report operational metrics from various sources, which may include infrastructure support services as well as elements of the computer itself. Metrics to be gathered and reported by the monitoring agent, as well as the format in which metrics are to be reported, are specified declaratively so that they can be changed without altering the procedural aspects of the monitoring agent.

20 Claims, 4 Drawing Sheets

OPERATIONAL REPORTING IN A COMPUTING ENVIRONMENT

BACKGROUND

Large-scale, network-based computing represents a paradigm shift from traditional client-server computing relationships. With large-scale, network-based service platforms (e.g., data centers), customers are able to leverage shared resources on demand by renting resources that are owned by third parties and that reside "in the cloud." With these resources, users of the platform are able to launch and maintain large applications without actually owning or servicing the underlying infrastructure necessary for these applications. As a result, network-based service platforms have expanded the class of individuals and companies able to effectively compete in the realm of computing applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
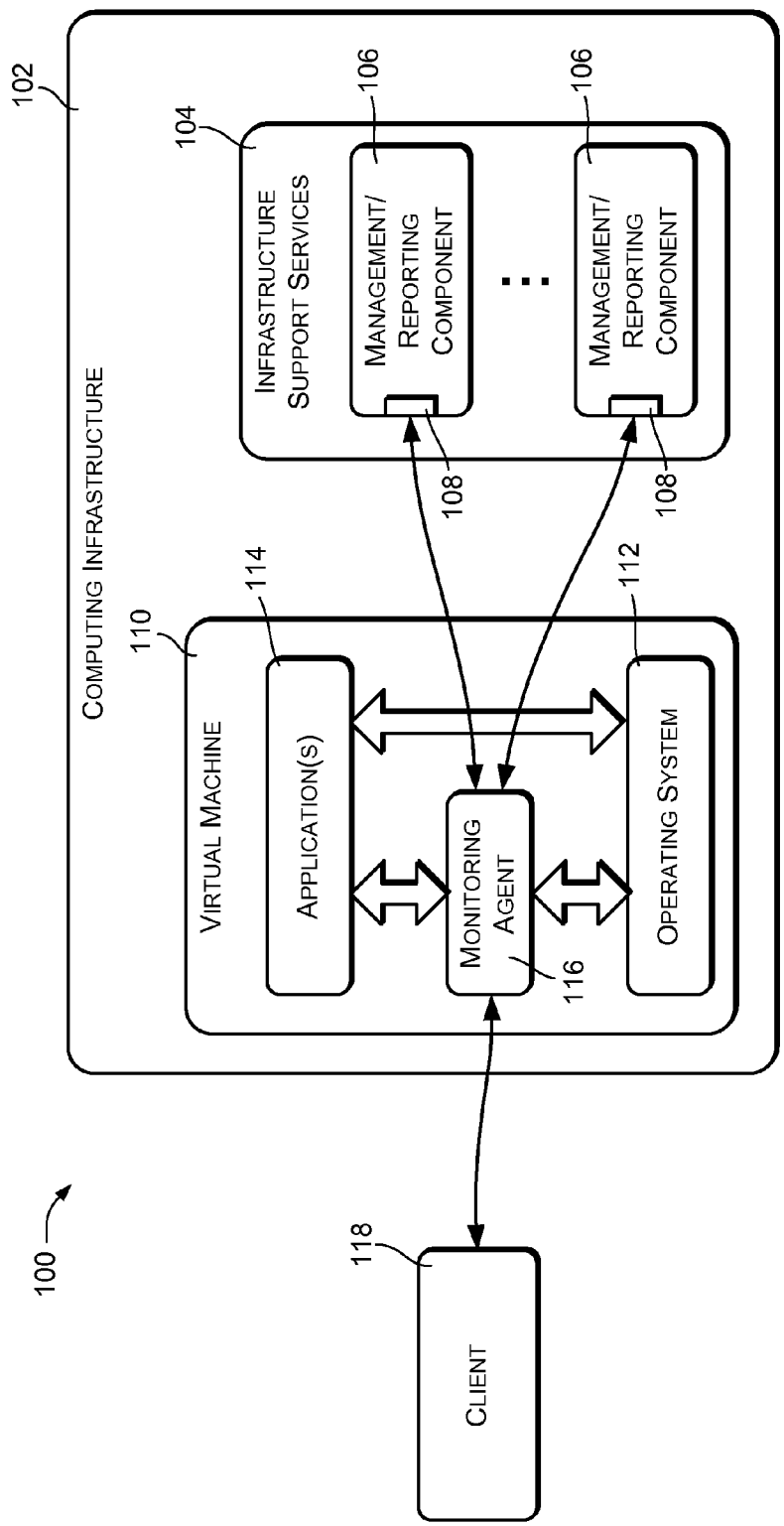
FIG. 1 is a block diagram illustrating an example virtual computing environment and infrastructure in which a virtual machine is configured to report performance related metrics to a requesting client.

This disclosure describes systems, components, and techniques for monitoring and reporting with respect to resources that are implemented in online or network-accessible computing infrastructures, including virtual computing infrastructures. Such resources may include physical and/or virtual computers and servers, data storage, processors, functional units, services, etc.

When using an infrastructure provider a customer may utilize multiple virtual computers, also referred to as virtual machines or machine instances. Each virtual machine may have its own operating system (OS), which is referred to in this environment as a guest OS. The virtual machine may operate within a virtual private network, and may interact with other resources such as network components, storage resources, and so forth, which may be provided by the infrastructure provider. One or more applications are typically installed by the customer on the virtual machine to provide the specific functionality desired by the customer.

In this environment, operational metrics regarding a virtual machine are available to the customer from various sources. Certain metrics may be obtained from the guest OS of the virtual machine, for example. In addition, other metrics may be available from sources outside the virtual machine, such as from supervisory or support services of the computing infrastructure. In many cases, the infrastructure supervisory services do not, however, have access to information from the guest OS.

Customers may at times wish to install pre-designed or off-the-shelf applications on virtual machines. In some cases, applications such as this may be designed to receive operational information regarding the virtual computers upon which they are executing as well as information regarding other elements of the supporting infrastructure. Certain applications may expect specific metrics, in specific formats. Different applications may expect different collections of metrics, and may expect to receive such metrics in various different formats.

In order to provide operational information to a computer application and other clients, a monitoring agent executes within the virtual computer upon which the computer application is installed. The monitoring agent is configured to interact with elements of the virtual computer, such as the guest OS of the virtual computer, to obtain operational information regarding the virtual computer. In addition, the monitoring agent is configured to interact with elements of the virtual computing infrastructure in order to obtain additional operational information regarding the virtual computer, as well as to obtain operational information regarding infrastructure components and services. Operational information may relate to performance, utilization, efficiency, speed, capacity, status, errors, and other aspects relating to the operations of elements and components.

The monitoring agent is configurable by means of declarative specifications, so that desired operational metrics and output formats may be defined and obtained without modifying or redesigning the procedural aspects of the monitoring agent. The declarative specifications include a source specification that specifies a plurality of operational metrics that are to be retrieved by the monitoring agent. The source specification specifies a declarative set of parameters corresponding to each operational metric. Each set of parameters specifies a source of the corresponding operational metric, including information allowing the monitoring agent to query an appropriate information source to obtain the corresponding metric.

The declarative specifications may also include a format specification that lists a subset of the metrics specified by the source specification. The format specification may declaratively specify a format for a report that is to be prepared by the monitoring agent and provided to requesting clients, in which each of the listed metrics is included.

The report prepared by the monitoring agent may be requested by and provided to various clients. For example, an application executing on the virtual computer may request and utilize the operational information provided by the monitoring agent. As another example, clients external to the virtual machine and/or to the virtual computing infrastructure may request and receive operational information from the monitoring agent.

FIG. 1 illustrates an example environment 100 for obtaining and reporting operational metrics in accordance with these techniques. The environment of FIG. 1 includes an online or network-based computing infrastructure 102, which may provide a wide variety of computing resources. The network-based computing infrastructure 102 may be referred to as a virtual computing infrastructure, an Infrastructure as a Service (IaaS), and/or a Platform as a Service (PaaS). Resources supported or provided by the computing infrastructure 102 may include dedicated servers, shared servers, virtual servers, server slices, processors, processor cycles, storage, memory, and so forth. In some cases, the resources may be available in scalable increments or amounts, which can be dynamically increased or decreased in response to usage and/or demand.

A computing infrastructure such as the computing infrastructure 102 of FIG. 1 typically provides various types of infrastructure administrative and support services 104. The support services 104 allow creation, modification, and deletion of infrastructure resources such as virtual machines. The support services 104 may also be queried to obtain operational status and metrics regarding resources provided to the customer of the computing infrastructure 102.

The support services 104 may be accessible to customers or users through interactive interfaces. The support services 104 may also, or alternatively, be accessible to applications and other logical elements through programmatic means. For example, applications executing on virtual machines may use APIs (application program interfaces) exposed by the infrastructure support services 104 to retrieve information regarding resources such as virtual machines and supporting infrastructure.

More specifically, the support services 104 may implement a plurality of management and/or reporting components or web services 106 to provide different types of metrics regarding virtual machine instances and other aspects of the customer's virtual computing environment.

For example, a management/reporting component 106 may be available for providing metadata regarding individual virtual machine instances. Such metadata may include metrics such as instance IDs, network addresses, security information, instance types, and so forth.

As another example, another management/reporting component 106 may be available for providing metrics relating to infrastructure resources, including metrics relating to resource utilization, application performance, and operational health.

As yet another example, the support services 104 may include administrative services for creating and managing virtual machine instances.

The management/reporting components 106 of the support services 104 may be accessible through various programmatic means, including function calls, APIs, HTTP (hypertext transfer protocol) interfaces, and so forth.

In some embodiments the support services 104 may be configured to interact with users according to a web services model, and the management/reporting components 106 may be implemented as web services. Generally speaking, a web service may refer to any type of computing service that is made available to a requesting client via a request interface that includes one or more Internet-based application layer data transport protocols, such as a version of the Hypertext Transport Protocol (HTTP) or another suitable protocol. In this embodiment, the management/reporting components 106 may expose web services endpoints 108 having Uniform Resource Locators (URLs), e.g., http://storageservice.domain.com. Clients may interact with the management/reporting components 106 through the corresponding web services endpoints 108.

Web services may be implemented in a variety of architectural styles, using a variety of enabling service protocols. For example, in a Representational State Transfer (REST)-style web services architecture, the parameters that are pertinent to a web services call (e.g., specifying the type of service requested, user credentials, user data to be operated on, etc.) may be specified as parameters to the data transport command that invokes the web services call to the web services endpoint, such as an HTTP GET or PUT command. In some implementations, REST-style web services architectures are stateless, in that each web services call may contain all the information necessary to process that call without reference to external state information. In contrast to REST-style web services architectures, document-based or message-based web services architectures may encode the parameters and data pertinent to a web services call as a document that may be transmitted to a web services endpoint and then decoded and acted upon by the endpoint. For example, a version of eXtensible Markup Language (XML) or another suitable markup language may be used to format the web services request document. In some embodiments, the markup language used to format the request document may delimit parameters that control the processing of the request, while in other embodiments certain features of the markup language itself (e.g., certain tags) may directly control aspects of request processing. Additionally, in some embodiments the resulting document may be encapsulated within another protocol, such as a version of the Simple Object Access Protocol (SOAP), for example, in order to facilitate processing of the web services request by the endpoint.

Other protocols may also be employed within various embodiments of web services architectures. For example, a version of Web Services Description Language (WSDL) may be employed by a web services endpoint to publish its interfacing requirements to potential clients. Web services endpoints may make themselves known to potential clients through a directory protocol such as a version of the Universal Description, Discovery and Integration (UDDI) protocol. Numerous other types of protocols relating to the provision of computing services via web services interfaces may exist, and any given web services implementation may use any suitable combination of such protocols.

It is contemplated that in some embodiments, the management/reporting components 106 may support interfaces other than web services interfaces, instead of or in addition to web services interfaces. For example, an enterprise may implement a particular service for use by clients external to the enterprise, who may access the service via web services protocols, as well as users within the enterprise, who may use a different type of interface (e.g., a proprietary interface customized to the enterprise's intranet). In some embodiments, management/reporting components 106 may support each of the various types of interfacing protocols through which any user of the storage service may access the service. In other embodiments, different instances of the management/reporting components 106 may be provided for each distinct interface approach.

A customer of the computing infrastructure 102 may create a virtual machine 110 through appropriate interaction with the infrastructure support services 104. The virtual machine 110 may be configured with a guest operating system (OS) 112 and one or more applications 114. In addition, the customer may install a monitoring agent 116 on the virtual machine. The monitoring agent 116 may be configured to obtain operational metrics regarding the virtual machine 110 and the environment of the virtual machine 110, and to report the metrics to a client 118. The client 118 may be external to the virtual machine 110 and computing infrastructure 102 as illustrated, or may be a programmatic component within the virtual machine 110. For example, the client 118 may in some situations comprise one of the applications 114. In other words, an application 114 may be configured to act as a client to the monitoring agent 116 and to receive operational metrics from the monitoring agent 116.

The monitoring agent 116 is configured to gather operational metrics from the various management/reporting components 106 of the infrastructure support services 104. In addition, the monitoring agent 116 is configured to gather operational metrics from the virtual machine 110 itself, such as from the operating system 112 of the virtual machine 110.

The monitoring agent 116 is further configured to aggregate and format the gathered operational metrics, and to report the metrics to the client 118. The specific metrics to be obtained and reported, as well as the characteristics of the report provided to the client 118, are defined declaratively by editable source and format specifications, so that both the metrics and the reporting format may be changed without modifying the monitoring agent itself. More specifically, different metrics may be selected for reporting, and the format of the reporting may be changed, without requiring changes to the procedural or programmatic aspects of the monitoring agent 116.

Figure 2:
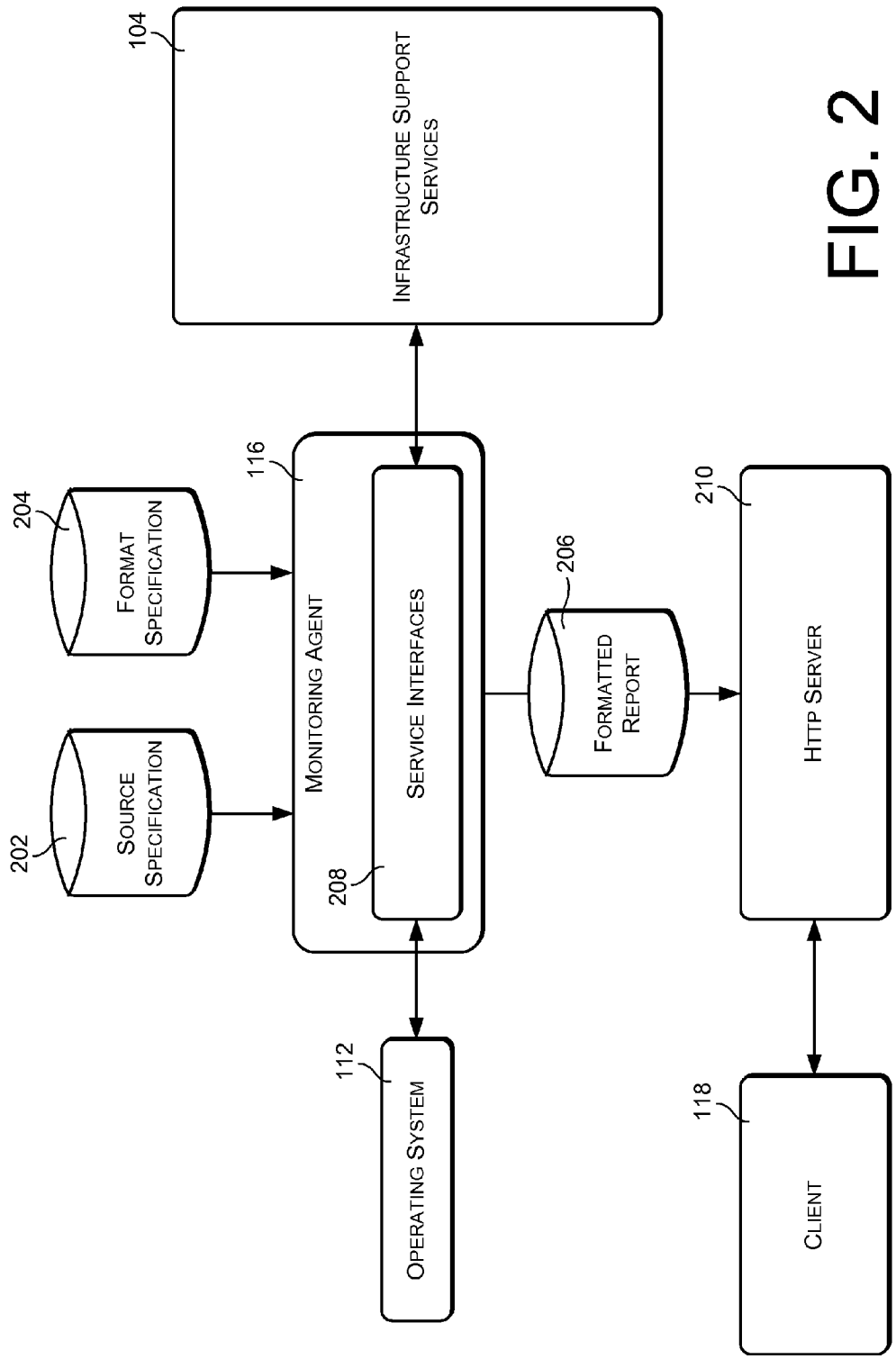
FIG. 2 is a block diagram illustrating an example of how reporting may be performed in an environment such as shown by FIG. 1.

FIG. 2 illustrates further details regarding an example implementation of the monitoring agent 116. The monitoring agent 116 is response to a declarative source specification 202 and a declarative format specification 204 to produce a formatted report 206.

The source specification 202 lists a plurality of metric definitions. Each metric definition indicates an individual operational metric to be gathered or retrieved by the monitoring agent 116, as well as a set of parameters that indicates declaratively how to obtain the metric. The parameters for a particular metric may include a source name or identifier, indicating a source of the metric. Possible sources may include any one of the management/reporting components 106, the guest operating system 112, and other components or elements, including one or more of the applications 114. The parameters corresponding to a particular metric may also include identifying information regarding the metric such as its name, the function or API name that should be used to retrieve the metric, and other information that may be needed to obtain the metric. As specific examples, the metric parameters may include one or more of the following:
- a network address;
- a network port;
- a network entity;
- a function name;
- a function parameter;
- a namespace;
- etc.

The source specification 202 may be provided in an appropriate declarative language such as JSON (JavaScript Object Notation) or XML (Extensible Markup Language). JSON and XML are examples of text-based declarative formats in which parameters may be specified as hierarchical collections of name/value pairs.

In some cases, the source specification 202 may include static metrics to be associated with metric definitions. In other words, a metric definition may specify static data, rather than a dynamic data source.

The format specification 204 lists a set of metrics that are to be reported to the client 118, as well as information regarding how the metrics should be formatted. Generally, metrics are specified in the format specification 204 by referencing metric names defined in the source specification 202. The format specification 204 may provide names and other information regarding the metrics that are to be provided to the client 118. The format specification 204 may be provided in a text-based declarative language such as JSON or XML, in which parameters and data are specified as hierarchical collections of name/value pairs.

The monitoring agent 116 may have a plurality of service interfaces 208, corresponding respectively to different metrics providers such as the guest operating system 112 of the virtual machine 110 and the management/reporting components 106 of the infrastructure support services 104. The service interfaces 208 provide the procedural functionality for interacting with the metrics providers. An individual service interface 208 may be configured for interaction with a specific type of metrics provider, such as by using appropriate function calls, API calls, and so forth. Procedural aspects of provider interaction are provided by the service interfaces 208, while specific parameters regarding individual metrics are provided declaratively by the definitions of the source specification 202.

In operation, the client 118 may issue a request to obtain a formatted report 206. In some implementations, the request may be submitted to an HTTP server 210, which may be implemented by the monitoring agent 116 or otherwise implemented in conjunction with the virtual machine 110. For example, the HTTP server 210 may be implemented as a background service on the virtual machine 110. Upon receiving a request, the HTTP server interacts with the monitoring agent 116 to obtain the formatted report 206, and provides the formatted report 206 to the requesting client 118. The formatted report 206 contains all of the metrics specified by the format specification 204. Depending on the nature of the format specification 204, the report 206 may be formatted to comply with a hierarchical markup language such as XML.

The source and format specifications 202 and 204 may be selected or configured to provide a report 206 that contains the data expected by any particular client 118, and that is formatted as expected by the client 118. Different types of clients, having different expectations for report data, may be accommodated by providing different source and format specifications 202 and 204.

Figure 3:
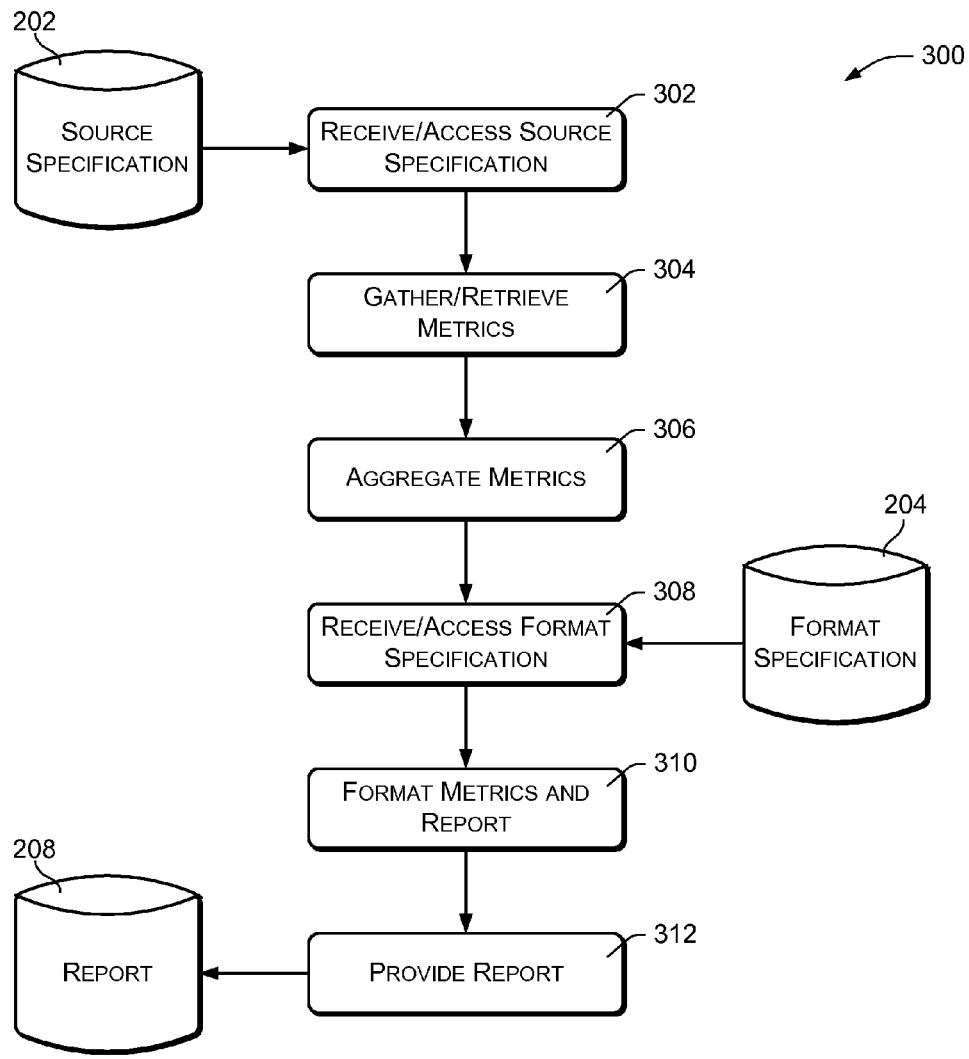
FIG. 3 is a flow diagram illustrating an example reporting process in an environment such as shown by FIG. 1.

FIG. 3 illustrates an example of a process 300 that may be performed in some embodiments to provide metrics regarding operational aspects of a virtual machine to a requesting client. The process may be performed by a monitoring agent installed as a background process on a virtual machine in conjunction with a customer application that acts as the client. The monitoring agent may provide data obtained from an infrastructure provider as well as from the virtual machine upon which the monitoring agent is installed.

An action 302 comprises receiving and/or accessing a source specification 202. The source specification comprises a plurality of metric definitions, corresponding respectively to different metrics that are to be gathered from the environment of the virtual machine and its applications. Each metric definition specifies a metric that is available from the virtual machine or its supporting infrastructure. In addition, each metric definition includes a set of parameters corresponding to the metric specified by the definition. Each set of parameters declaratively specifies a source of the corresponding operational metric, as well as other parameters that may be expected by the source in order to identify a particular one of many available metrics.

An action 304 comprises gathering or retrieving a plurality of operational metrics. This may comprise gathering from a virtual machine upon which the monitoring agent is installed, and may further include gathering metrics from the virtual computing infrastructure upon which the virtual machine is implemented. The gathering 304 is based at least in part on the declarative source specification. Specifically, operational metrics to be gathered from the virtual machine and the supporting infrastructure are specified by the source specification as described above.

An action 306 comprises aggregating the metrics that have been gathered from the virtual machine and supporting infrastructure.

An action 308 comprises receiving and/or accessing a declarative format specification 204, also referred to herein as an output specification, which specifies a set or subset of the operational metrics of the source specification 202.

An action 310 comprises formatting the retrieved metrics based at least on part on the format specification 204, to create a report 208 that contains the set of operational metrics specified by the declarative output specification 204.

An action 312 comprises providing the report 208 to a requesting or consuming client. The client may comprise an application running on the same virtual machine as the monitoring service, or may be external to the virtual machine and/or virtual computing infrastructure.

In some embodiments, reports 208 may be created periodically and cached, so that they can be provided immediately to requesting clients. For example, a particular report may be created and cached every 60 seconds. When a client requests the report 208, it is then provided from the cache. This avoids any delays that may be associated with querying the management reporting components 106.

The techniques described above provide a flexible way of providing reporting services to various types of applications that may be installed by customers in conjunction with a virtual computing infrastructure. The particular metrics to be gathered, as well as the nature and format of reports provided to requesting clients, may be easily varied by editing declarative files, rather than by reprogramming data collection agents.

Figure 4:
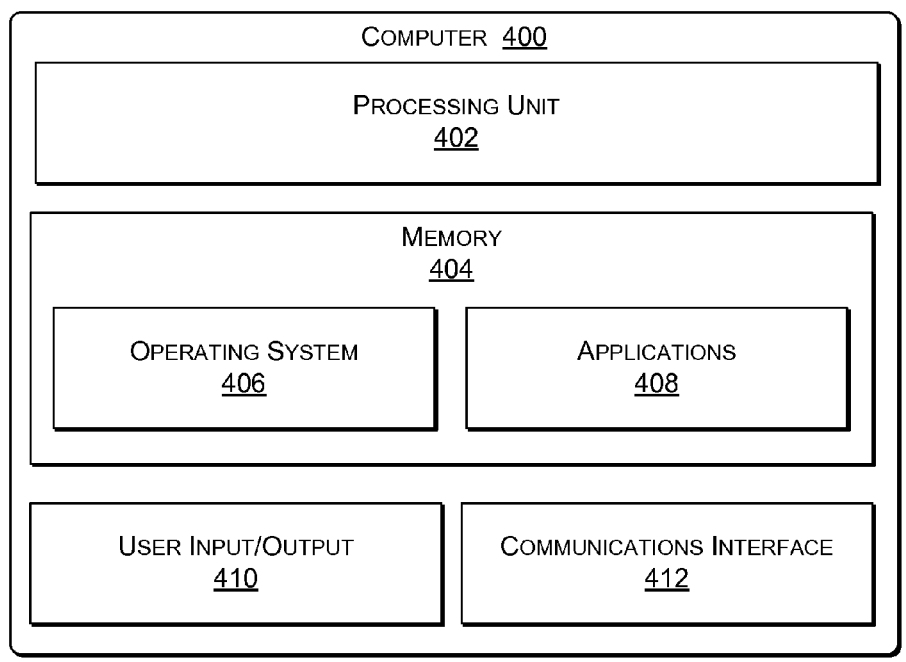
FIG. 4 is a block diagram showing high-level components of an example computer that may be used to implement the systems and techniques described herein.

FIG. 4 shows relevant components of an example computer 400 that may be used to implement physical and/or virtual servers and computers of the computing infrastructure 102. The various entities described above may of course be implemented in many different ways.

The example computer 400 may comprise one or more processing units 402 and one or more forms of computer-readable memory 404. The memory 404 may comprise volatile and nonvolatile memory. Thus, the memory 404 may include, but is not limited to, RAM, ROM, EEPROM, flash memory, or other memory technology, or any other medium which can be used to store applications and data. The memory 404 may also include removable media such as optical disks, portable devices/drives, and so forth.

The memory 404 may be used to store any number of functional components, such as programs and program modules that are executable on the processing unit 402. For example, the memory may store an operating system 406 and various applications or user-specified programs 408. The operating system 406 and/or the user-specified programs 408 may include components, modules, and/or logic for performing the actions described herein. More specifically, executable components stored in the memory 404 may comprise computer-executable instructions that, when executed, cause the one or more processing units 402 to perform acts and to implement techniques described herein.

The computer 400 may also have user input/output components 410, such as a display, keyboard, mouse, etc. The computer 400 may also comprise a communications interface 412 such as a network interface.

Generally, the functionality described herein may be implemented by one or more computers such as shown by FIG. 4 or by similar devices, with the various actions described above distributed in various ways across the different computers. Computers of the computing infrastructure 102 may be located together or separately, and organized as virtual servers, server banks, and/or server farms. The described functionality may be provided by the computers of a single entity or enterprise, or may utilize the computers and/or services of multiple entities or enterprises.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that, when executed, cause one or more processors to perform acts comprising:
    accessing a declarative source specification that specifies (a) a plurality of metrics available from a virtual computer and a virtual computing infrastructure upon which the virtual computer executes, and (b) a set of parameters corresponding to each of the metrics, wherein each set of parameters specifies a source of the corresponding metric;
    retrieving the plurality of metrics from the virtual computer and the virtual computing infrastructure based at least in part on the declarative source specification;
    accessing a declarative output specification that specifies a set of the metrics; and
    providing a report based at least in part on the declarative output specification, wherein the report contains the set of the metrics specified by the declarative output specification; and
    wherein the acts are executed as a background process, and wherein the declarative source specification comprises a hierarchical collection of name/value pairs.

2. The one or more non-transitory computer-readable media of claim 1, wherein the declarative output specification specifies a report format, the acts further comprising formatting the report in accordance with the declarative output specification.

3. The one or more non-transitory computer-readable media of claim 1, wherein each set of parameters indicates one or more of:

a network address;
a network port;
a network entity;
a function name;
a function parameter;
a namespace; or
a parameter name.

4. The one or more non-transitory computer-readable media of claim 1, the acts further comprising receiving one or more of the metrics from an operating system of the virtual computer.

5. The one or more non-transitory computer-readable media of claim 1, the acts further comprising receiving one or more of the metrics from one or more administrative components of the virtual computing infrastructure.

6. The one or more non-transitory computer-readable media of claim 1, wherein providing the report comprises providing the report to an application that is installed for execution on the virtual computer.

7. A method, comprising:
  executing a monitoring agent within a computer of a computing infrastructure, wherein the computing infrastructure provides multiple administrative services that are accessible through corresponding service endpoints, and wherein the monitoring agent is configured to perform acts comprising:
    gathering first metrics from the computer;
    gathering second metrics from the computing infrastructure by accessing one or more of the administrative services through the corresponding service endpoints; wherein:
      gathering the first and second metrics is based at least in part on a plurality of metric definitions, each metric definition corresponding to an individual metric of one of the first and second metrics; and
      each metric definition indicates declaratively how to obtain the corresponding individual metric;
    aggregating the first and second metrics; and
    reporting the aggregated first and second metrics to a client.

8. The method of claim 7, the acts performed by the monitoring agent further comprising:
  accessing a source specification containing a hierarchical collection of name/value pairs that specify declaratively how to obtain the first and second metrics from the computer and the computing infrastructure; and
  wherein gathering the first and second metrics is based at least in part on the source specification.

9. The method of claim 7, the acts performed by the monitoring agent further comprising formatting the first and second metrics in accordance with a declarative format specification, wherein the reporting comprises reporting the formatted first and second metrics to the client.

10. The method of claim 7, wherein gathering the first metrics comprises receiving the first metrics from an operating system of the computer.

11. The method of claim 7, wherein the client comprises an application that is installed for execution on the computer.

12. The method of claim 7, further comprising executing the monitoring agent as a background process.

13. A method comprising:
  accessing a source specification containing a hierarchical collection of name/value pairs that specify declaratively how to obtain a first metrics and a second metrics from a computer and a computing infrastructure;
  gathering the first metrics from the computer of the computing infrastructure;
  gathering the second metrics from the computing infrastructure by accessing one or more of administrative services of the computing infrastructure through service endpoints of the administrative services, wherein gathering the first and second metrics is based at least in part on the source specification;
  aggregating the first and second metrics; and
  reporting the aggregated first and second metrics to a client.

14. The method of claim 13, wherein the method is performed by a monitoring agent that executes on the computer.

15. The method of claim 13, wherein the client comprises an application that is installed for execution on the computer.

16. The method of claim 13, wherein:
  gathering the first and second metrics is based at least in part on a plurality of metric definitions, each metric definition corresponding to an individual metric of one of the first and second metrics; and
  each metric definition indicates declaratively how to obtain the corresponding individual metric from one or more of the administrative services.

17. The method of claim 13, further comprising formatting the first and second metrics in accordance with a declarative format specification, wherein the reporting comprises reporting the formatted first and second metrics to the client.

18. A method, comprising:
  executing a monitoring agent within a computer of a computing infrastructure, wherein the computing infrastructure provides multiple administrative services that are accessible through corresponding service endpoints, and wherein the monitoring agent is configured to perform acts comprising:
    accessing a source specification containing a hierarchical collection of name/value pairs that specify declaratively how to obtain a first metrics and a second metrics from the computer and the computing infrastructure;
    gathering the first metrics from the computer;
    gathering the second metrics from the computing infrastructure by accessing one or more of the administrative services through the corresponding service endpoints, wherein gathering the first and second metrics is based at least in part on the source specification;
    aggregating the first and second metrics; and
    reporting the aggregated first and second metrics to a client.

19. The method of claim 18, the acts performed by the monitoring agent further comprising formatting the first and second metrics in accordance with a declarative format specification, wherein the reporting comprises reporting the formatted first and second metrics to the client.

20. The method of claim 18, further comprising executing the monitoring agent as a background process.

* * * * *